US006261066B1

(12) United States Patent
Linnemann et al.

(10) Patent No.: US 6,261,066 B1
(45) Date of Patent: Jul. 17, 2001

(54) MICROMEMBRANE PUMP

(75) Inventors: Reinhard Linnemann; Martin Richter; Stefan Kluge; Peter Woias, all of München (DE)

(73) Assignee: Fraunhofer-Gesellschaft Zur Forderung der Angewandten Forschung E.V. (DE)

( * ) Notice: Subject to any disclaimer, the term of this patent is extended or adjusted under 35 U.S.C. 154(b) by 0 days.

(21) Appl. No.: 09/423,512

(22) PCT Filed: Apr. 28, 1998

(86) PCT No.: PCT/EP98/02507

§ 371 Date: Nov. 10, 1999

§ 102(e) Date: Nov. 10, 1999

(87) PCT Pub. No.: WO98/51929

PCT Pub. Date: Nov. 19, 1998

(30) Foreign Application Priority Data

May 12, 1997 (DE) ............................................. 197 19 862

(51) Int. Cl.[7] .................................................. F04B 43/04
(52) U.S. Cl. .......................................... 417/53; 417/413.1
(58) Field of Search ........................... 417/48, 53, 413.1, 417/322, 207, 413.2; 73/700; 435/286.5, 287.2; 251/30.02; 137/501; 356/353

(56) References Cited

U.S. PATENT DOCUMENTS

| 5,180,288 | * | 1/1993 | Richter et al. ........................ 417/18 |
| 5,316,618 | * | 5/1994 | Van Lintel ........................... 156/644 |

(List continued on next page.)

FOREIGN PATENT DOCUMENTS

| 4143343 | 10/1991 | (DE) . |
| 69401250 | 5/1994 | (DE) . |

(List continued on next page.)

OTHER PUBLICATIONS

Quandt et al., "Magnetostrictive Thin Film Microflow Devices", Jun. 15–17, 1994, Conference Proceeddings Actuator 94, 4th International Conference on New Actuators.

(List continued on next page.)

Primary Examiner—Teresa Walberg
Assistant Examiner—Leonid Fastovsky
(74) Attorney, Agent, or Firm—Beyer Weaver & Thomas, LLP

(57) ABSTRACT

A micromembrane pump comprises a pump membrane which is adapted to be moved to a first and a second position with the aid of a drive means and a pump body connected to the pump membrane so as to define a pump chamber between these two components, the pump body being defined by two semiconductor plates having each formed therein a valve seat and a valve flap which are formed integrally with the respective semiconductor plate, the two semiconductor plates being connected in such a way that a respective passive non-return valve is defined by a valve seat of one semiconductor plate and by a valve flap of the other semiconductor plate, one of the passive non-return valves being arranged in an inlet opening penetrating both semiconductor plates, whereas the other of the non-return valves is arranged in an outlet opening penetrating both semiconductor plates. The pump membrane increases the volume of the pump chamber by a stroke volume when moving from the first to the second position and reduces the volume of the pump chamber by this stroke volume when moving from the second to the first position. According to the present invention, the ratio $\epsilon$ of the stroke volume to the volume of the pump chamber satisfies the following equation, when the pump membrane is at the first position:

$$\varepsilon \geq \left(\frac{p_0}{p_0 - |\Delta p_{crit}|}\right)^{\frac{1}{\gamma}} - 1$$

wherein $p_0$ is the atmospheric pressure, $\Gamma$ the adiabatic coefficient, and $\Delta p_{crit}$ the maximum pressure value which depends on the valve geometry and on the wetting of the valves and which is required for opening the valves.

10 Claims, 6 Drawing Sheets

U.S. PATENT DOCUMENTS

| | | | |
|---|---|---|---|
| 5,542,821 | | 8/1996 | Dugan . |
| 5,569,855 | * | 10/1996 | Schomburg et al. .................. 73/700 |
| 5,585,011 | | 12/1996 | Saaski et al. . |
| 5,674,742 | * | 10/1997 | Northrup et al. ................ 435/286.5 |
| 5,725,363 | * | 3/1998 | Bustgens et al. ................. 417/413.1 |
| 5,759,015 | * | 6/1998 | Van Lintel ........................... 417/322 |
| 5,810,325 | * | 9/1998 | Carr ................................. 251/30.02 |
| 5,839,467 | * | 11/1998 | Saaski et al. ......................... 137/501 |
| 5,871,336 | * | 2/1999 | Young ................................. 417/207 |
| 5,909,280 | * | 6/1999 | Zavracky ............................. 365/352 |
| 6,033,191 | * | 3/2000 | Kamper et al. ...................... 417/322 |
| 6,043,080 | * | 3/2000 | Lipshutz et al. .................. 435/287.2 |
| 6,109,889 | * | 8/2000 | Zengerle et al. .................. 417/413.2 |

FOREIGN PATENT DOCUMENTS

| | | |
|---|---|---|
| 19546570 | 12/1995 | (DE) . |
| 0134614 | 3/1985 | (EP) . |
| 0412270 | 2/1991 | (EP) . |
| 0703364 | 9/1994 | (EP) . |
| 2248891 | 4/1992 | (GB) . |
| 92/22763 | 12/1992 | (WO) . |

OTHER PUBLICATIONS

Bustgens et al., "Micromembrane Pump Manufactured by Molding", Jun. 15–17, 1994, Conference Proceddings Actuator 94, $4^{th}$ International Conference on New Actuators.

Van Lintel et al., "A Piezoelectric Micropump Based on Micromachining of Silicon" Mar. 17, 1988, Sensors and Actuators pp. 153–167.

Olsson et al., "The First Valve–Less Diffuser Gas Pump", 1997, IEEE, pp. 108–113.

R. Zengerle, "Mikro–Membranpumpen Als komponenten Fur Mikro–Fluidsysteme", 1994, Verlag Shaker Aachen pp. 11–16.

\* cited by examiner a)

g)

h)

i)

MICROMEMBRANE PUMP

BACKGROUND OF THE INVENTION

1. Field of the Invention

The present invention relates to a micromembrane pump and, in particular, to a micromembrane pump comprising a pump membrane, a pump body and inlet and outlet openings provided with passive non-return valves.

2. Description of Prior Art

According to the prior art a large number of different micromembrane pumps exists, the drive concepts used being predominantly electromagnetic, thermal and piezoelectric driving principles. Electromagnetic driving principles are described e.g. in E. Quandt, K. Seemann, Magnetostrictive Thin Film Microflow Devices, Micro System Technologies 96, pp. 451–456, VDE-Verlag GmbH, 1996. Thermal drive concepts are explained e.g. in B. Büstgens et al, Micromembrane Pump Manufactured by Molding, Proc. Actuator 94; Bremen 1994, pp. 86–90. EP-A-0134614 and H. T. G. Van Lintel et al, A Piezoelectric Micropump Based on Micrmachining of Silicon, Sensors & Actuators, 15, 1988, pp. 153–167, explain piezoelectric driving principles.

Piezoelectric drives are based on the use of piezoceramics causing a movement of the pump membrane and producing therefore a pumping effect in combination with a valve unit and a connection unit, respectively. There are several variations of piezoelectrically driven micromembrane pumps operating with active valves, with passive non-return valves or also with valveless fluidic connections. Such valveless fluidic connections are disclosed e.g. in A. Olsson et al: The First Valve-less Diffuser Gas Pump, Proceedings MEMS 97, pp. 108–113, Nagoya, Japan, 1997.

EP-A-0134614 describes a peristaltic pump making use of three piezomembranes, one piezomembrane being positioned at the inlet, the other one at the outlet and a further one between these two. On the basis of the periodic movement of the piezomembrane at the inlet and the movements of the piezomembranes at the outlet and in the middle, which are displaced in phase relative to the first-mentioned periodic movement, a pumping movement of the medium to be pumped is accomplished in the final analysis.

In addition, piezoelectric bending transducers, which are fixedly held on one side thereof, are known, the pump membrane being secured to a free end of these bending transducers. Such drive units are combined with a valve unit consisting of passive non-return valves.

Like the above-mentioned peristaltic pumps, the aforementioned valveless piezomembrane pumps make use of a piezomembrane as a drive unit, a fluidic connection unit being used, which consists of conically tapering channels with different flow resistances. By means of these pyramidal diffusers a direction-dependent flow resistance is defined, which produces a pumping effect in one direction. Like the other micropumps, also such a micropump including a valveless connection unit can build up a counterpressure during operation; this counterpressure can, however, no longer be maintained when the drive unit is switched off.

A known micromembrane pump which has an electrostatic drive is described in R. Zengerle: Mikromembranpumpen als Komponenten für Mikro-Fluidsysteme; Verlag Shaker; Aachen 1994; ISBN 3-8265-0216-7, and shown in DE 41 43 343 A1. Such a micropump is shown in FIG. 1.

The micropump shown in FIG. 1 consists of four silicon chips, two of these chips defining the electrostatic actor consisting of a flexible pump membrane 10 and a counterelectrode 12 which is provided with an insulating layer 14. The two other silicon chips 16 and 18 define a pump body having flap valves 20 and 22 arranged therein. A pump chamber 24 is formed between the pump body, which is defined by the silicon chips 16 and 18, and the flexible pump membrane 10, which is connected to the pump body along the circumference thereof. A spacer layer 28 is arranged between the suspension devices 26 of the flexible pump membrane 10 and the counterelectrode.

When an electric voltage is applied to the electrostatic actor, the elastic pump membrane 10 is electrostatically attracted to the rigid counterelectrode 12, whereby a negative pressure is generated in the pump chamber 24, this negative pressure having the effect that the pump medium flows in via the inlet flap valve 22, cf. arrow 30. When the voltage has been switched off and the charge has been balanced by short-circuiting the electrodes, the pump membrane will relax and displace the pump medium from the pump chamber via the outlet flap valve 20.

In contrast to the above-described electrostatic drives, the pump membrane of a piezoelectrically operated micropump is moved by piezoelectric forces, a piezoelectric crystal being connected to the pump membrane. The application of an electric voltage to the piezoelectric crystal causes a contraction or an elongation of the crystal and therefore a bending deformation of the membrane, which, together with a valve unit of the type shown e.g. in FIG. 1, finally produces a pumping effect. With the exception of the different drive means, also a piezoelectrically driven micropump could have the structural design described in FIG. 1.

The above-described electrostatically driven micromembrane pumps have a plurality of disadvantages when used in the form shown e.g. in FIG. 1.

Due to the small stroke of the electrostatic actor, typically 5 $\mu$m, and the comparatively large pump chamber volume, the height of the pump chamber being typically 450 $\mu$m, such a known pump has a very small compression ratio. The term compression ratio stands for the ratio of the displaced pumping volume to the total pump chamber volume. Due to this small compression ratio, it is impossible to convey compressible media, such as gases, since the compressibility of such media normally exceeds the compression ratio of the pump.

Furthermore, the pump chamber of the known pumps described has a geometry which is disadvantageous as regards fluid dynamics and which is, moreover, not bubble tolerant. Inclusions of air in a fluid pump medium accumulate in the pump chamber and, due to their comparatively high compressibility, they cause a substantial deterioration of the pumping characteristics. In addition, a self-priming behaviour cannot be achieved due to the poor compression behaviour. Due to the production process used, the pump membrane of the known micropumps is, in addition, in electrical contact with the medium conveyed. Since voltages in the order of 200 V occur at the actor during operation, substantial electric potentials may exist in the pump medium in the case of failure, and, depending on the respective case of use, these electric potentials may cause a malfunction of external components. In addition, known micro-pumps are mounted by glueing individual chips according to the prior art known at present, this kind of mounting being incapable of satisfying the requirements which have to be fulfilled for an efficient production.

Also existing piezoelectric micromembrane pumps show most of the above-mentioned disadvantages. Fundamentally, a substantial advantage of the piezoelectric micropump in comparison with the electrostatic micropump is to be seen in the possibility of driving the actor also by voltages which are lower than 200 V. Hence, the pumping rate can be adjusted via the frequency as well as via the driving voltage, a circumstance which may result in substantial simplifications as far as the driving electronics is concerned.

DE 195 46 570 C1 shows a micromembrane pump defined by a structured silicon plate and a glass sheet connected thereto, non-return valves being formed in the structured silicon plate. DE 694 01 250 T2 shows a fluid pump without passive non-return valves. The pump disclosed in this publication has a small pump chamber so that the pump can be filled due to capillary forces alone.

It is the object of the present invention to provide a micromembrane pump which eliminates the above-mentioned disadvantages of the prior art, which permits compressible media to be conveyed, and which shows a self-priming behaviour and is bubble-tolerant. It is a further object of the present invention to provide a method of producing a pump body for such a micromembrane pump.

In accordance with a first aspect of the present invention, this object is achieved by a micromembrane pump comprising a pump membrane which is adapted to be moved to a first and a second position with the aid of a drive means, and a pump body connected to the pump membrane so as to define a pump chamber between these two components, the pump body being defined by two semiconductor plates having each formed therein a valve seat and a valve flap which are formed integrally with the respective semiconductor plate, the two semiconductor plates being connected in such a way that a respective passive non-return valve is defined by a valve seat of one semiconductor plate and by a valve flap of the other semiconductor plate, one of these passive non-return valves being arranged in an inlet opening penetrating both semiconductor plates, whereas the other of these non-return valves is arranged in an outlet opening penetrating both semiconductor plates. The pump membrane increases the volume of the pump chamber by a stroke volume when moving from the first to the second position and reduces the volume of the pump chamber by this stroke volume when moving from the second to the first position. According to the present invention, the ratio e of the stroke volume to the volume of the pump chamber satisfies the following equation, when the pump membrane is at the first position:

$$\varepsilon \geq \left(\frac{p_0}{p_0 - |\Delta p_{crit}|}\right)^{\frac{1}{\gamma}} - 1$$

wherein $p_0$ is the atmospheric pressure, $\Gamma$ the adiabatic coefficient, and $\Delta_{p_{crit}}$ the maximum pressure value which depends on the valve geometry and on the wetting of the valves and which is required for opening the valves.

The present invention is based on the finding that the compression ratio, i.e. the ratio between the displaced pumping volume and the total pump chamber volume, is a decisive criterion of the behaviour of a micromembrane.

Such a compression ratio can be achieved in the case of one embodiment by using an electrostatic drive means as a drive means whose electrostatic actor is defined by the pump membrane and a counterelectrode, the pump membrane having a substantially planar structural design of such a nature that it abuts on the pump body at the first end position outside the inlet opening and the outlet opening.

Such a compression ratio can also be achieved in an advantageous manner by a pump body defined by two semiconductor plates which are connected at the main surfaces thereof, the inlet and the outlet valve being each defined by valve seats and valve flaps etched in these semiconductor plates and arranged in valve wells defining the inlet opening and the outlet opening. According to preferred embodiments, the semiconductor plate facing the pump membrane is thinned so as to define a shallow valve well between the semiconductor-plate surface facing the pump membrane and the valve flaps.

In accordance with a second aspect of the present invention this object is achieved by a method of producing a pump body of the type in question, the first step of this method being the step of structuring a respective first main surface of a first and of a second semiconductor plate for defining a valve flap structure of the inlet valve and a valve seat structure of the outlet valve in the first disc and a valve flap structure of the outlet valve and a valve seat structure of the inlet valve in the second disc. Following this, a valve flap well structure and a valve opening well structure are formed in a predetermined relationship with the valve flap structures and the valve seat structures in a respective second main surface of the first and of the second semiconductor plate. The first main surfaces of these first and second semiconductor plates are then connected in such a way that a respective valve flap structure is arranged in a predetermined relationship with a respective valve seat structure. Following this, at least one of the semiconductor plates is thinned starting from the second main surface, whereupon the respective second main surfaces of the first and of the second semiconductor plate are etched at least in the area of the valve flap well structure and of the valve opening well structure so as to expose the valve flaps and open the valve seat. The two last-mentioned steps of thinning and etching can be carried out in one operation.

The present invention provides a micromembrane pump showing a self-priming behaviour, this micromembrane pump being suitable for conveying compressible media and being, in addition, bubble-tolerant. Hence, the present invention provides a micropump offering manifold new possibilities of use because it is easy to handle. Furthermore, due to the stacklike structural design, the pumping concept according to the present invention is generally suitable for final assembly at wafer level; in comparison with numerous other concepts, it is therefore very adavantageous from the point of view of production engineering.

Further developments of the present application are disclosed in the dependent claims.

BRIEF DESCRIPTION OF THE DRAWINGS

In the following, preferred embodiments of the present invention will be explained in detail making reference to the drawings enclosed, in which.

DESCRIPTION OF PREFERRED EMBODIMENTS OF THE INVENTION

Figure 1:
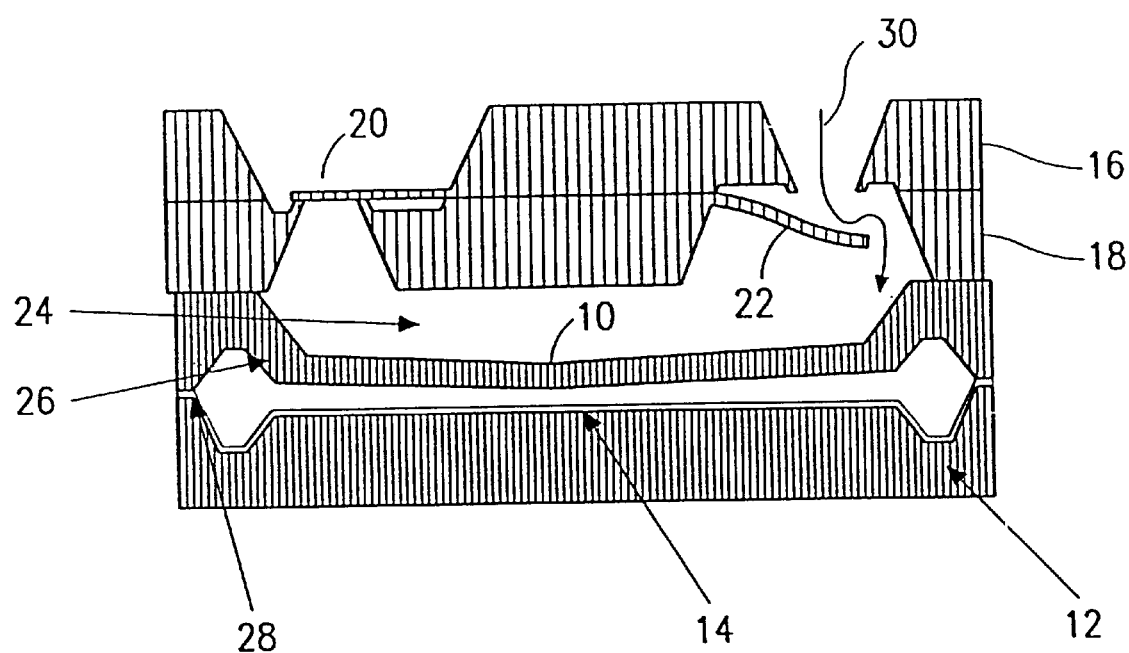
FIG. 1 shows a known micromembrane pump with an electrostatic drive.

In the following, design criteria for a bubble-tolerant micropump will be explained first of all, these design criteria constituting the basis of the present invention.

A point of decisive importance for the bubble tolerance and the self-filling capability is the compression ratio $\epsilon := \Delta V : V_0$. The volume $\Delta V$ is the volume displaced by the micro-membrane in one cycle, the so-called stroke volume. The volume $V_0$, which is also referred to as dead volume, represents the pump chamber volume in the relaxed condition of the membrane. Due to the small stroke of microactors and due to a dead volume which is predetermined by technological boundary conditions, the compression ratio of micropumps is normally small.

When the compression ratio is known, the pressure peaks can be calculated via the state equation of the medium conveyed. When a critical pressure of $\Delta p_{crit}$ for opening a valve is assumed, a criterion for the minimum compression ratio required results therefrom. In the case of a pump chamber filled with water, this compression ratio can be very small, since water is almost incompressible. If, however, an air bubble is contained in the pump chamber, the state equation of gases has to be used for this bubble. Air is much more compressible than water, and, consequently, the compression ratio required will increase strongly. In the worst case, the air bubble fills the whole pump chamber, the criterion for the necessary compression ratio of a bubble-tolerant pump being then as follows:

$$\varepsilon \geq \left(\frac{p_0}{p_0 - |\Delta p_{crit}|}\right)^{\frac{1}{\gamma}} - 1$$

wherein $p_0$ is the atmospheric pressure and $\Gamma$ the adiabatic coefficient.

For determining this necessary compression ratio, the critical pressure $\Delta p_{crit}$ was measured in the case of the passive microvalve of the micropump. In the course of these measurements, the great importance of surface tensions and of adhesion forces in the field of microfluidics became evident. When the valves were filled completely or when they were dry, a critical pressure of only approximately $\Delta p_{crit} = 10$ hPa was measured, whereas in the case of valves whose support structure had already been wetted with water the sevenfold critical pressure of $\Delta p_{crit} = 70$ hPa was measured.

The point of decisive importance for this higher criterion in the case of a support structure wetted with water is the higher pressure, since it cannot be excluded that the air bubble is located at the valve. Assuming isothermal changes of state, i.e. $\Gamma = 1$, the compression ratio must satisfy the condition $\epsilon \geq 0.075$ in the present passive microvalves having $\Delta p_{crit} = 70$ hPa. In other words, the dead volume must not exceed the stroke volume by a factor greater than 13.333.

When electrostatically operated micromembrane pumps are provided with a conventional structural design, the stroke volume is approx. 50 nl=0.05 µl, whereas the dead volume is 28 µl. Hence, the compression ratio is $\epsilon = 0.0018$ or 1:550 and is therefore much too small.

For increasing the compression ratio, two measures can primarily be taken into account. On the one hand, an increase of the stroke volume $\Delta V$, and, on the other hand, a reduction of the dead volume $V_0$.

In the case of an electrostatically operated micromembrane pump, the stroke volume is determined by the structural design of the micromembrane pump and cannot be enlarged easily. It follows that, with determined lateral dimensions, an increase of the compression ratio can only be achieved by minimizing the dead volume.

In the case of a piezoelectric drive having the same lateral dimensions of 7 mm×7 mm the stroke volume can, however, be more than doubled, i.e. typically increased to 100 nl, in comparison with the electrostatic drive by a suitable selection of the drive parameters, i.e. the ratio of the thickness of the ceramics to the thickness of the membrane and the lateral dimensions of the ceramics. This has the effect that the compression ratio is improved by a factor of 2.

According to preferred embodiments, the present invention aims at a reduction of the dead volume formed by the drive unit and the valve unit. Suitable measures permitting such a reduction of the dead volume will be described in the following.

In FIGS. 2a), 2b), 3a) and 3b), embodiments of a micromembrane pump according to the present invention are shown. FIG. 2a) shows a micromembrane pump according to the present invention on the basis of a piezoelectric actor 100. The piezoelectric actor used will be described in detail hereinbelow making reference to FIG. 5. A pump body is defined by two semiconductor plates, preferably silicon wafers, 102 and 104. The semiconductor plates 102 and 104 have formed therein an inlet valve 106 and an outlet valve 108 by means of micromechanical methods. Advantageous methods of forming such a structure will be described later on with reference to FIGS. 6–8. A pump chamber 112 formed between the pump body and a micromembrane 110 has in the relaxed condition of the micromembrane 110 according to the present invention a volume which exceeds the stroke volume by a factor of 13.333 at the most, the stroke volume being produced by driving the membrane 110 by means of the piezoelectric drive 100. As can be seen in FIG. 2a), the silicon substrate 102 is thinned for this purpose on the surface facing the micromembrane so as to permit the realization of a pump chamber volume which is as small as the above-mentioned one.

FIG. 2b) shows an embodiment of a micromembrane pump according to the present invention on the basis of an electrostatic drive. The electrostatic drive consists of a counterelectrode 120 and of an electrostatic actor 122 serving as a micromembrane. This electrostatic drive will be explained in detail hereinbelow with reference to FIG. 4.

A pump body is again realized by two silicon substrates 102 and 104 having passive non-return valves 106 and 108 formed therein. As can be seen in FIG. 2b), the electrostatic actor 122, which serves simultaneously as a micromembrane, is essentially planar so that this actor rests on the pump body in the areas outside of the inlet and outlet openings in which the non-return valves 106 and 108 are formed. Due to this structural design, a compression ratio having the value according to the present invention can be obtained in the case of the electrostatic drive.

FIGS. 3a) and 3b) show two additional embodiments according to the present invention, which differ from the embodiments shown in FIGS. 2a) and 2b) only with regard to the second silicon substrate defining the pump body. In the embodiments shown in FIGS. 3a) and 3b) also the second silicon substrate 104', which forms the pump body together with the silicon substrate 102, is thinned, this second silicon substrate being thinned on the side facing away from the micromembrane 122. A pump body of the type shown in FIGS. 3a) and 3b) is obtained by a production method of the kind explained hereinbelow with reference to FIG. 7.

Figure 4:
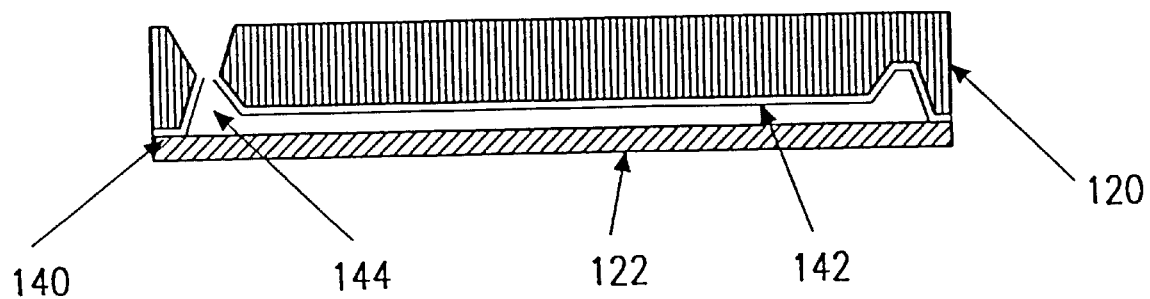
FIG. 4 shows an electrostatic micropump drive for use in a micropump according to the present invention.

FIG. 4 shows a planar electrostatic micropump drive of the kind which is adapted to be used in the present invention. The electrostatic drive differs from the drive shown in FIG. 1 essentially with regard to a planar actor consisting of a rigid counterelectrode 120 and a membrane 122 having a small thickness throughout the whole area thereof. Hence, the pump-chamber-volume percentage defined by the drive unit is reduced to zero, as can be seen in FIG. 2b), and this contributes essentially to an increase in compression.

The planar electrostatic actor described can be produced e.g. by the method described hereinbelow. First of all, starting wafers are produced for the counterelectrode 120 and the pump membrane 122. This comprises especially the provision of a possibility of electric contacting, e.g. the application of bond pads, and, in the case of electrically non-conductive starting materials, the production of a suitably structured conductive coating for realizing the electrode surfaces, again with the possibility of electric contacting. Subsequently, a spacer layer 140 is formed on the future mounting surface of the pump membrane 122 and of the counterelectrode 120. In addition, insulating layers 142 are formed on all points of contact of the two wafers so as to prevent an electric short circuit between the electrodes.

The two starting wafers are connected by a structured connection at the spacer layer 140. Following this, the starting wafer for the pump membrane 122 is removed in full area until the desired final thickness of the pump membrane has been obtained.

Depending on the material chosen, a mechanical removal, e.g. by means of grinding, or etching can be used as a removing method for producing the flexible electrostatically driven pump membrane 122. For supporting etching processes, the pump membrane 122 can be implemented as a multilayer structure on the upper surface thereof, the multilayer structure including as lowermost layer an etch-stop layer on the future lower surface of the membrane. The production of the pump membrane does not require any structuring process so that in addition to the optimization of the compression ratio a minimization of the production costs can be achieved by such an essentially planar electrostatic micropump drive.

A more far-reaching structuring of the lower surface of the pump membrane, e.g. the production of additional auxiliary structures such a spacers or flow passages, or the subsequent removal or application of coatings, can take place after the full-area removal. This more far-reaching structuring includes e.g. the application of additional layers for increasing the chemical resistance, for electric insulation or for purposefully adjusting mechanical properties, e.g. a locally varying membrane thickness so as to achieve a locally inhomogeneous elasticity.

The materials that can be used as starting materials for the counterelectrode 120 and for the pump membrane 122 are especially silicon, glass or plastic materials. The spacer layer 140 can be produced in arbitrary combination by structuring or by additive application on one or on both of the two starting wafers. Depending on the starting materials used, the methods that can be used for connecting the counter-electrode 120 and the pump membrane 122 are e.g. glueing for arbitrary materials, anodic bonding for silicon-glass combinations or silicon-silicon combinations with a glass spacer layer, or silicon fusion bonding for a silicon-silicon combination. In order to permit a connection method which requires an increase in temperature, e.g. in the case of anodic bonding, openings 144 are provided in the counter-electrode 120 of the electrostatic actor; these openings permit an equalization of pressure with regard to the surroundings in the case of a temperature-dependent expansion and compression of the gas volume between the pump membrane 122 and the counterelectrode 120. These openings can also be arranged in the spacer layer 140.

Figure 5:
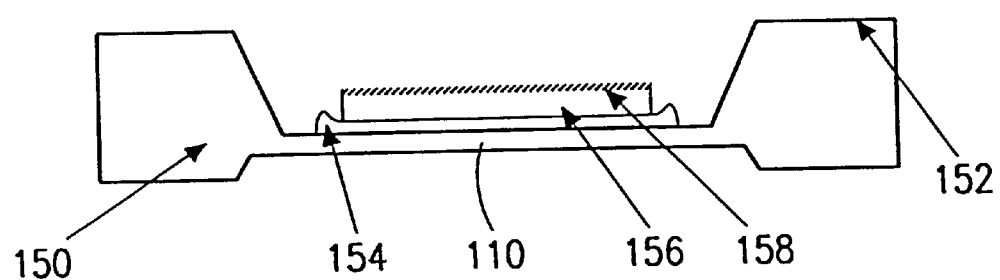
FIG. 5 shows a piezoelectric micropump drive for use in a micropump according to the present invention.

FIG. 5 shows a piezoelectric actor for use in a micromembrane pump according to the present invention. A pump membrane 110 has fastening structures 150 for attaching the membrane 110 to a pump body. The fastening structures and the membrane are coated with an electrically conductive layer 152 on the side facing away from the pump body. By means of a connecting layer 154, a piezoactive material 156 is attached to the membrane 110. Also the piezoactive material 156 is coated with a conductive layer 158. For insulating the pump chamber, an insulating layer can be provided below the conductive layer 152.

In the following, methods of producing the piezoelectric actor will be described briefly. First of all, the thin pump membrane 110 is formed; in so doing, structures guaranteeing later an optimum flow between the inlet valve and the outlet valve must be provided in the pump chamber. In addition, the lower surface of the pump membrane can be provided with a more far-reaching structure, e.g. by the production of additional auxiliary structures in the form of spacers and flow passages. Furthermore, coatings can be applied or removed subsequently. This includes, in turn, the application of additional layers for increasing the chemical resistance, for electric insulation or for purposefully adjusting mechanical properties, e.g. a locally varying membrane thickness so as to achieve a locally inhomogeneous elasticity.

Following this, the pump membrane 110 is connected to a piezoelectric material 156. The piezoelectric material may be in the form of a crystal or, alternatively, it may be applied in the form of a thin layer 156 directly to the pump membrane 110. Both sides of the piezomaterial must be electrically contactable, a non-conductive layer 154, e.g. an adhesive layer, being admissible as a connection between the lower piezosurface and the electrically conductive pump membrane 110, since an electric field is decisive for realizing the piezoeffect.

When also connection methods requiring an increase in temperature are used for producing the piezoelectric drive, it may perhaps be necessary to repolarize the piezomaterial 156 after the use of these methods. For this purpose, a high electric voltage has to be applied to the crystal; the material should have a temperature corresponding approximately to the Curie temperature of the actor material, typically 180° C.–350° C.

Figure 2:
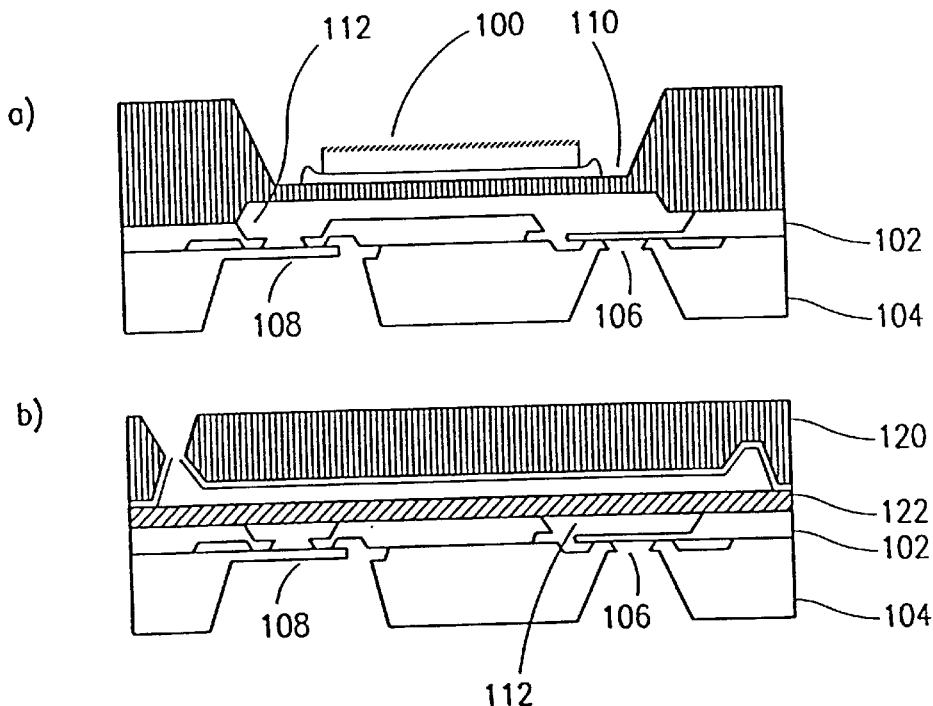
FIGS. 2a) and b) show two embodiments of a micromembrane pump according to the present invention.
Figure 3:
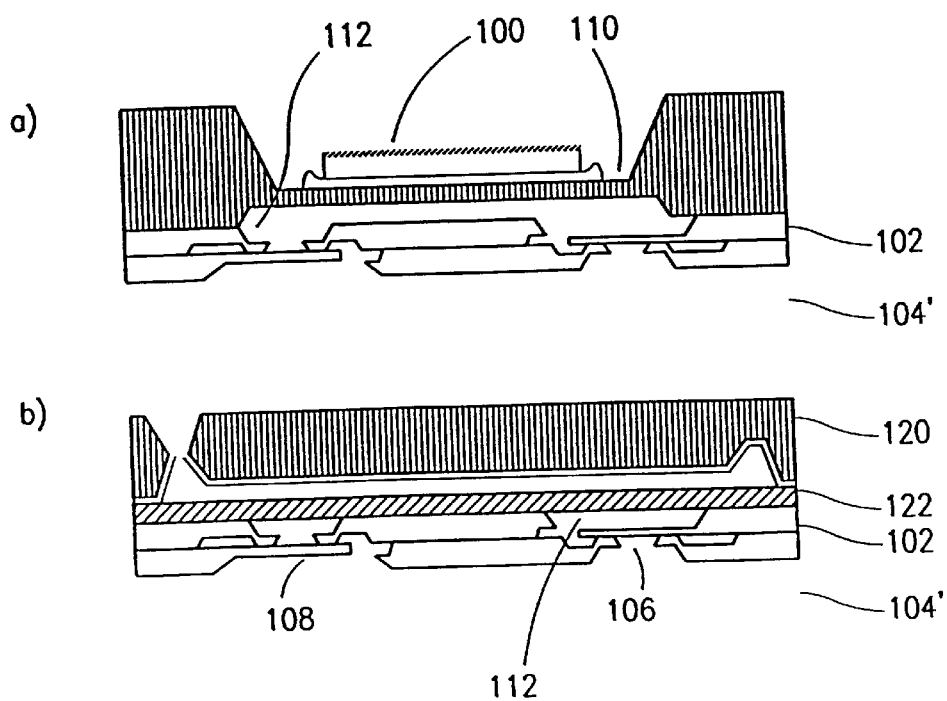
FIGS. 3a) and b) show two further embodiments of micro-membrane pumps according to the present invention.

For forming the micromembrane pump according to the present invention, the actor devices described with respect to FIGS. 4 and 5 are attached to a pump body, whereby a micromembrane pump of the kind described hereinbefore with respect to FIGS. 2 and 3 is produced.

In the following, methods for producing a pump body, which is suitable for the micromembrane pump according to the present invention, will be described.

The starting material used for the valve unit is preferably silicon, which substantially influences the properties of the valve flaps with regard to the opening pressure and the resonance behaviour. Like the above-described planar drive unit, the production of the pump body together with the valve unit according to the present invention also aims at the smallest possible pump chamber volume. This applies especially to the internal valve chip which contributes to the pump chamber volume.

One possibility of reducing the pump chamber volume is the thinning of this valve chip. But especially the thinning of such valve chips entails substantial problems. On the one hand, mechanical thinning, e.g. grinding or polishing, may perhaps cause damage to the flap due to the strong vibrations occurring during such mechanical thinning, i.e. the valve flap may break at its fixing point. A chemical process for thinning the valve chip cannot be used either, since the existing valve flaps must be protected against chemical removal, and this is only possible on the basis of a very high investment in the field of process engineering.

According to the present invention, a two-stage process contributes to the solution of the above-mentioned problems. In the following, different embodiments of methods will be described, which permit the thinning of the valve chip surface associated with the drive unit of a micropump without any damage being caused to the valve flaps and without any high investment in the field of process engineering.

Figure 6:
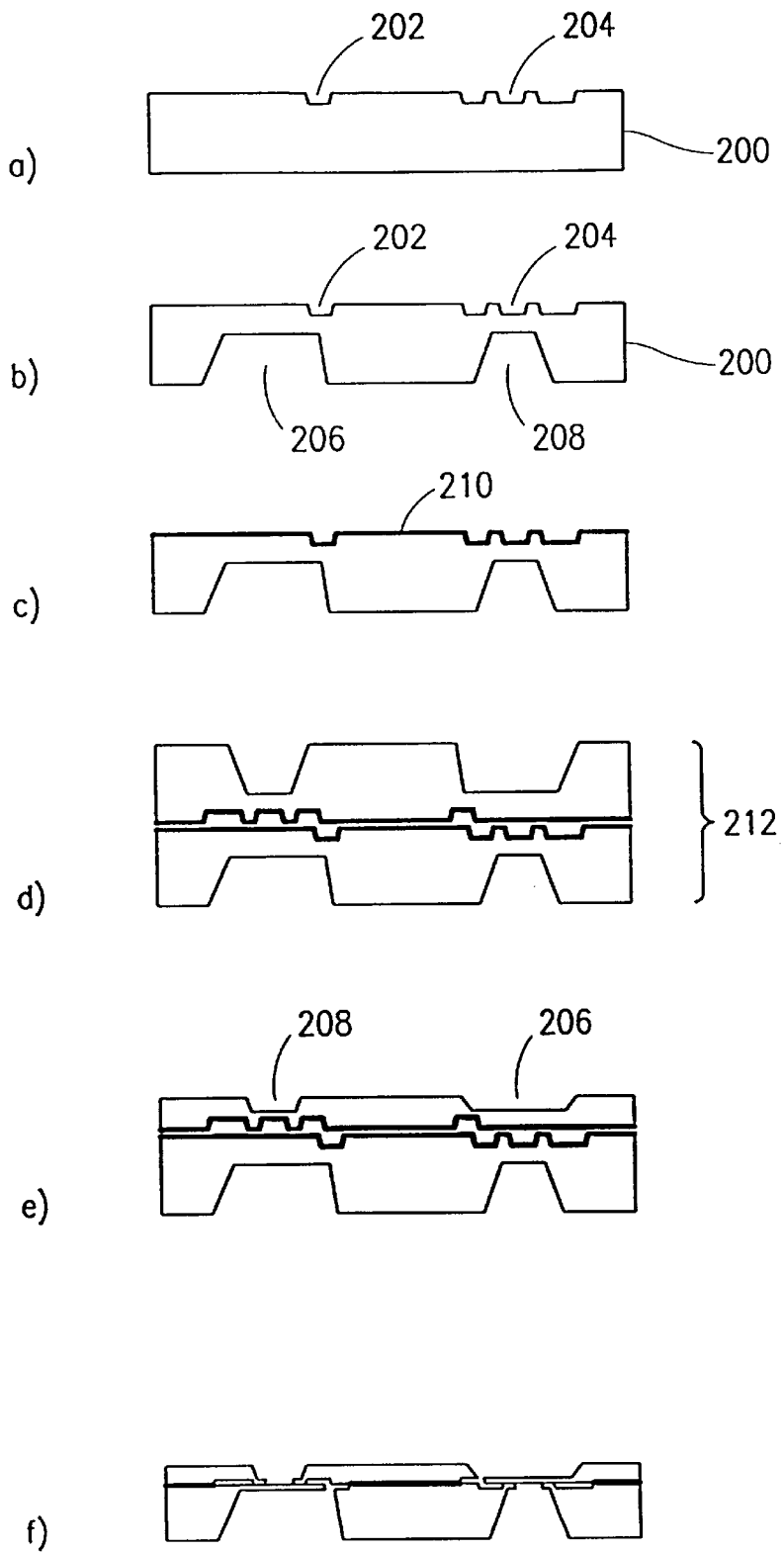
FIG. 6 shows schematic cross-sectional views for explaining a first embodiment of the method according to the present invention.

A first method is now described making reference to FIG. 6. The valve body with the integrated valve structure is formed making use of two semiconductor plates, preferably silicon plates, which are first subjected to treatments of the same kind in steps a)–c).

First of all, the valve chips 200 are prestructured on their front side, i.e. on a main surface thereof, so as to define a valve flap structure 202 and a valve seat structure 204, the prestructuring being carried out e.g. by means of an etching process. This prestructuring is shown in a step a) in FIG. 6. In a next step of the shown embodiment of the method according to the present invention, valve flap wells 206 and valve opening wells 208 are formed, e.g. by wet chemical etching processes, starting from the back of the chips in a predetermined relationship with the valve flap structures 202 and the valve seat structures 204, cf. step b). Following this, the valve chips 200 of this embodiment are coated with an oxide layer 210 on the upper surface thereof, step c).

Subsequently, the two chips are connected, e.g. by anodic bonding processes or by silicon fusion bonding, on the chip surfaces coated with the oxide layer, cf. step d). The two chips are arranged in such a way that the valve seat structures of one chip are in alignment with the valve flap structures of the other chip and vice versa. This results in a connection of the valve flaps and of the valve seat and, consequently, in a mechanical stabilization which will be of importance in the subsequent thinning process.

The pair of wafers 212 obtained after step d) is then thinned on one side thereof, cf. the upper wafer in step e), whereby the valve wells 206, 208 of the thinned wafer should be given the flattest possible shape. Subsequently, a final wet chemical etching process is carried out by means of which the flap structures are exposed and the valve seats are opened, cf. step f). The method according to the present invention used for producing the pump body with an integrated valve structure according to the present invention is now finished.

Figure 7:
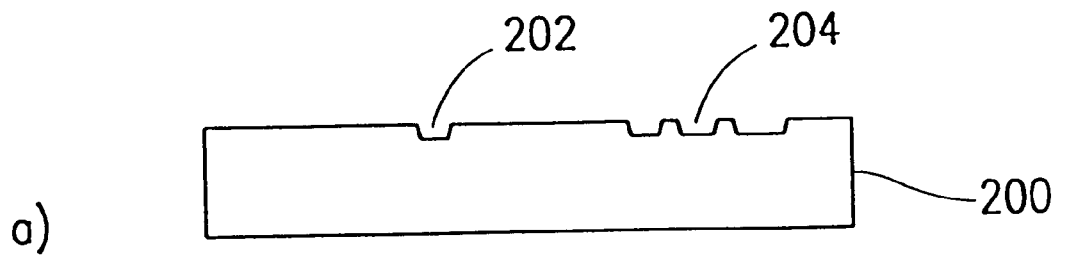
FIG. 7 shows schematic cross-sectional views for explaining a second embodiment of the method according to the present invention.
Figure 7:
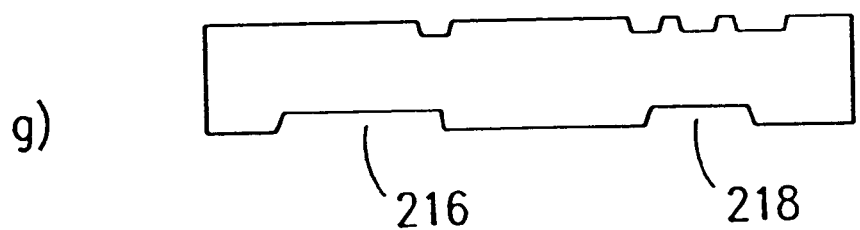
Figure 7:
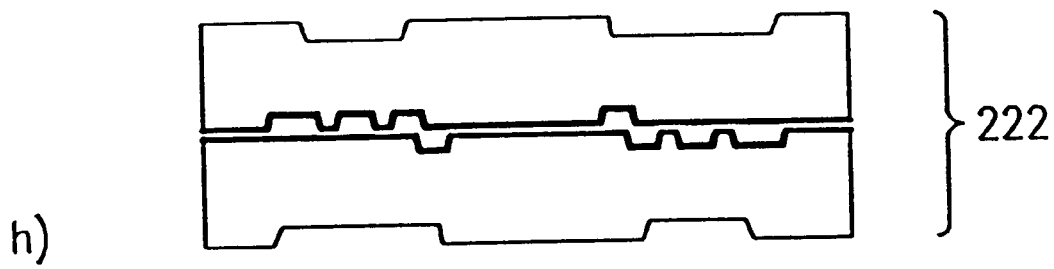
Figure 7:
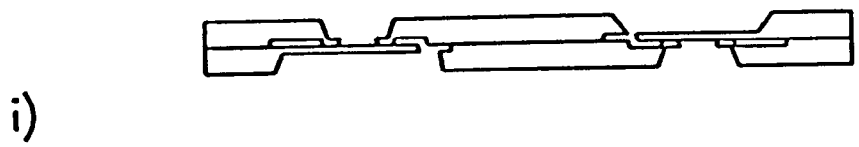

Making reference to FIG. 7, an alternative method will be described in the following. First of all, valve seat structures 204 and valve flap structures 202 are defined in a main surface of the valve chip 200 in a manner corresponding to step a) in FIG. 6. Subsequently, valve flap wells 216 and valve opening wells 218 are produced in a step g) on the back of the chips. In this embodiment, the wells have a well depth corresponding to the well depth of the finished pump chip. After this structuring the valve wafers are again connected so as to define a valve unit 222, cf. step h). The essential difference in comparison with the method described with respect to FIG. 6 is to be seen in the last step; in the method shown in FIG. 7, the thinning of the wafer is not carried out mechanically on one side, but in a step i) by chemical processes on both sides. The chemical etching process is carried out until the flaps and the valve openings, respectively, have been exposed. The result is a pair of wafers consisting of two wafers having the same thickness.

Figure 8:
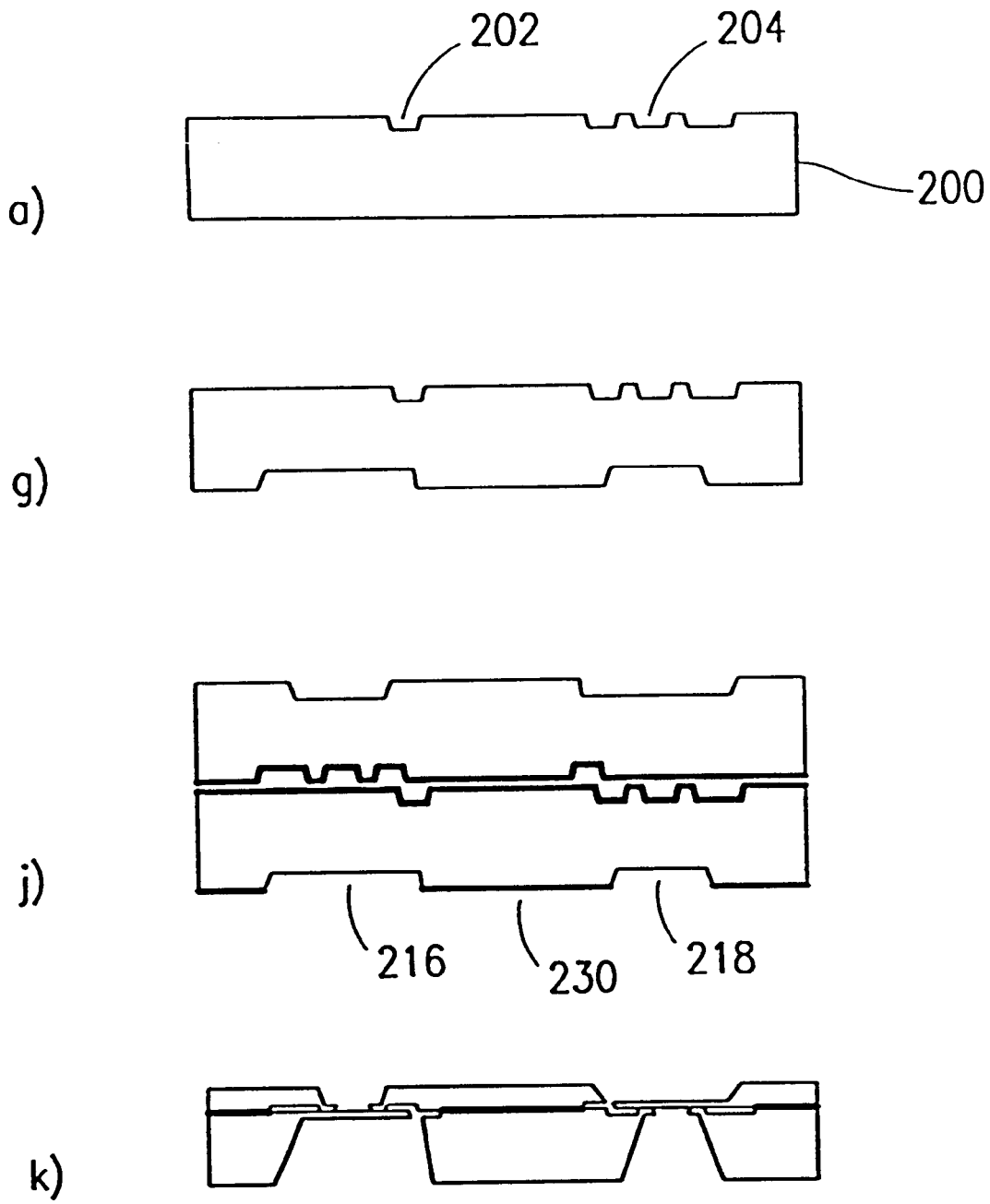
FIG. 8 shows schematic cross-sectional views for explaining a third embodiment of the method according to the present invention.

A further alternative method according to the present invention will be explained hereinbelow making reference to FIG. 8. Steps a) and g) shown in FIG. 8 correspond to steps a) and g) shown in FIG. 7. Subsequently, the valve chips are again connected so as to form a valve unit, as can be seen in a step j), the inlet and the outlet being still closed at this stage. Now an etching mask 230 is, however, applied to the surface of the lower chip with the exception of the structured wells 216 and 218. Hence, only the upper chip will be thinned in a subsequent wet chemical etching process, whereas not the entire lower chip is thinned together with the upper one, since the mask 230 prevents etching of the whole chip so that the lower chip is etched only in the prestructured wells 216 and 218 and has the original thickness when the structure has been finished, cf. step k). Hence, a wafer package is obtained, which, after the exposure of the flaps, includes a planar valve unit directed towards the pump chamber, when the pump chamber is defined by the pump body and a micromembrane attached to the upper chip.

When the drive unit and the valve unit have been produced in the manner described hereinbefore, the two units must be connected to one another. An economy-priced and simultaneously reproducable connection technique can, however, only be realized when mounting takes place at wafer level. Also for this connection, a large number of techniques and methods offer themselves, e.g. glueing, silicon fusion bonding, anodic bonding and eutectic bonding. High-temperature methods can again entail a depolarization of the piezomaterial and may therefore necessitate a subsequent polarization of the piezoactor.

When the drive unit has been connected to the valve body, the micromembrane pumps shown in FIGS. 2 and 3 are obtained; the described methods of producing the pump body and the described drive means permitting the high compression ratio according to the present invention.

It follows that the present invention provides, on the one hand, self-priming and bubble-tolerant micromembrane pumps which are suitable for conveying compressible media. On the other hand, the present invention provides methods which can be used for producing the pump body with an integrated valve unit of such a self-priming micromembrane pump according to the present invention.

What is claimed is:

1. A micromembrane pump comprising:
    a pump membrane which is adapted to be moved to a first and a second position with the aid of a drive means; and
    a pump body connected to said pump membrane so as to define a pump chamber between these two components,
    said pump body being defined by two semiconductor plates having each formed therein a valve seat and a valve flap which are formed integrally with the respective semiconductor plate, the two semiconductor plates being connected in such a way that a respective passive non-return valve is defined by a valve seat of one semiconductor plate and by a valve flap of the other semiconductor plate, one of said passive non-return valves being arranged in an inlet opening penetrating both semiconductor plates, whereas the other of said non-return valves is arranged in an outlet opening penetrating both semiconductor plates,
    said pump membrane increasing the volume of the pump chamber substantially by a stroke volume when moving from the first to the second position and reducing the volume of the pump chamber substantially by a stroke volume when moving from the second to the first position, wherein when the pump membrane is at the first position, the ratio $\epsilon$ of the stroke volume to the volume of the pump chamber satisfies the following equation:

$$\varepsilon \geq \left(\frac{p_0}{p_0 - |\Delta p_{crit}|}\right)^{\frac{1}{\gamma}} - 1$$

wherein $p_0$ is the atmospheric pressure, $\Gamma$ the adiabatic coefficient, and $\Delta p_{crit}$ the maximum pressure value which depends on the valve geometry and on the wetting of the valves and which is required for opening the valves.

2. A micromembrane pump according to claim 1, wherein the ratio $\epsilon$ is at least 0.075.

3. A micromembrane pump according to claim 1, wherein the drive means is an electrostatic drive means whose electrostatic actor is defined by the pump membrane and a counterelectrode, the pump membrane having a substantially planar structural design of such a nature that it abuts on the pump body at a first end position outside the inlet opening and the outlet opening.

4. A micromembrane pump according to claim 1, wherein the drive means is a piezoelectric drive means.

5. A micromembrane pump according to claim 1, wherein the pump body is defined by two semiconductor plates which are connected at the main surfaces thereof, the inlet and the outlet valve being each defined by valve seats and valve flaps etched in said semiconductor plates and arranged in valve wells defining the inlet opening and the outlet opening.

6. A micromembrane pump according to claim 5, wherein the semiconductor plate facing the pump membrane is thinned so as to define a shallow valve well between the semiconductor-plate surface facing the pump membrane and the inlet and outlet valves.

7. A micromembrane pump according to claim 5, wherein the semiconductor plates are formed from silicon.

8. A method of producing the pump body for a micromembrane pump according to claim 1, comprising the following steps:

8.1 structuring a respective first main surface of a first and of a second semiconductor plate for defining a valve flap structure of the inlet valve and a valve seat structure of the outlet valve in the first disc and a valve flap structure of the outlet valve and a valve seat structure of the inlet valve in the second disc;

8.2 forming a valve flap well structure and a valve opening well structure in a predetermined relationship with the valve flap structures and the valve seat structures in a respective second main surface of the first and of the second semiconductor plate;

8.3 connecting the first main surfaces of said first and second semiconductor plates in such a way that the respective valve flap structure is arranged in a predetermined relationship with a respective valve seat structure;

8.4 thinning at least one of the semiconductor plates starting from the second main surface; and 8.5 etching the respective second main surface of said first and of said second semiconductor plate at least in the area of the valve flap well structure and of the valve opening well structure so as to expose the valve flaps and open the valve seats.

9. A method according to claim 8, wherein, in step 8.4, both semiconductor plates are thinned starting from the second main surface.

10. A method according to claim 8, comprising prior to step 8.4 the additional step of applying an oxide layer to the respective first main surface of said first and of said second semiconductor plate.

* * * * *